United States Patent
Misra et al.

(10) Patent No.: US 11,630,641 B2
(45) Date of Patent: Apr. 18, 2023

(54) SYSTEM BEHAVIOR PROFILING-BASED DYNAMIC COMPETENCY ANALYSIS

(71) Applicant: ACCENTURE GLOBAL SOLUTIONS LIMITED, Dublin (IE)

(72) Inventors: Janardan Misra, Bangalore (IN); Kuntal Dey, Birbhum (IN); Vikrant Kaulgud, Pune (IN); Sanjay Podder, Thane (IN); Neville Dubash, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 277 days.

(21) Appl. No.: 17/157,599

(22) Filed: Jan. 25, 2021

(65) Prior Publication Data
US 2022/0236955 A1  Jul. 28, 2022

(51) Int. Cl.
| | |
|---|---|
| *G06F 8/10* | (2018.01) |
| *G06F 8/20* | (2018.01) |
| *G06F 8/71* | (2018.01) |
| *G06F 8/60* | (2018.01) |
| *G06F 11/36* | (2006.01) |

(52) U.S. Cl.
CPC .............. *G06F 8/10* (2013.01); *G06F 8/20* (2013.01); *G06F 8/60* (2013.01); *G06F 8/71* (2013.01); *G06F 11/36* (2013.01)

(58) Field of Classification Search
None
See application file for complete search history.

(56) References Cited

U.S. PATENT DOCUMENTS

| | | | | |
|---|---|---|---|---|
| 2007/0234272 A1* | 10/2007 | Hegyi | .................. | G06F 8/20 |
| | | | | 717/101 |
| 2014/0258975 A1* | 9/2014 | Bolotnikoff | ............ | G06F 8/355 |
| | | | | 717/120 |
| 2017/0103358 A1* | 4/2017 | Crook | .................. | G06Q 10/105 |
| 2017/0161179 A1* | 6/2017 | Maple | ................. | G06F 11/3684 |

(Continued)

OTHER PUBLICATIONS

D'Ambros et al., "An Extensive Comparison of Bug Prediction Approaches," IEEE, 2010, 11pg. (Year: 2010).*

(Continued)

*Primary Examiner* — Ryan D. Coyer
(74) *Attorney, Agent, or Firm* — Mannava & Kang, P.C.

(57) ABSTRACT

In some examples, system behavior profiling-based dynamic competency analysis may include identifying a plurality of software generation entities that have contributed to a module of a system, and generating an index to associate each software generation entity of the plurality of software generation entities. Execution links may be extracted from execution traces of the system, and an execution competency list may be generated. A dynamic competency score may be generated for each software generation entity for the system, and an overall dynamic competency score and a combined competency score may be determined. A software generation entity role may be obtained for a new application, and a software generation entity of the plurality of software generation entities may be identified to perform the software generation entity role. Development of the new application may be implemented using the identified software generation entity.

17 Claims, 9 Drawing Sheets

(56) References Cited

U.S. PATENT DOCUMENTS

| | | | |
|---|---|---|---|
| 2018/0275989 A1* | 9/2018 | Kakkad | G06F 11/3409 |
| 2019/0146986 A1* | 5/2019 | Dewan | G06F 16/00 |
| | | | 707/737 |
| 2020/0348931 A1* | 11/2020 | Rafey | G06F 16/9024 |
| 2020/0379756 A1* | 12/2020 | Gupta | G06F 16/24578 |
| 2022/0164751 A1* | 5/2022 | Nair | G06Q 30/0201 |

OTHER PUBLICATIONS

Lehtinen et al., "Perceived causes of software project failures—An analysis of their relationships," Elsevier, 2014, 21pg. (Year: 2014).*

Turhan et al., "On the relative value of cross-company and within-company data for defect prediction," Springer, 2009, 39pg. (Year: 2009).*

* cited by examiner

| SDLC Traceability Artifacts | Primary SDLC Roles |
|---|---|
| Software Requirements Specification | Requirement Analysis Agent |
| Architectural Documents | Technical and Functional Architect |
| Design Documents | Design Agent |
| | Development Agent |
| Test Plans | Testing Agent |
| Defect Logs | Testing Agent |
| | Maintenance Agent |
| Deployment Plan, | Deployment Agent |
| Software Configuration Documents | Deployment Agent |
| | Testing Agent |
| | Development Agent |
| Version Control System | Project Management Agent, Development Agent, ... |
| Software Repositories | [Multiple Roles] |

FIG. 4

| Module | Reward for Successful Execution | Penalty of Failed Execution |
|---|---|---|
| m1 | 0.1 | 1 |
| m2 | 0.2 | 2 |
| ... | ... | ... |
| m15 | 1.5 | 15 |

```
┌─────────────────────────────────────────────────────────────┐
│ IDENTIFY A PLURALITY OF SOFTWARE GENERATION ENTITIES THAT    │
│         HAVE CONTRIBUTED TO A MODULE OF A SYSTEM             │
│                            702                               │
└─────────────────────────────────────────────────────────────┘
                              ▼
┌─────────────────────────────────────────────────────────────┐
│      GENERATING AN INDEX TO ASSOCIATE EACH SOFTWARE          │
│  GENERATION ENTITY OF THE PLURALITY OF SOFTWARE GENERATION   │
│                          ENTITIES                            │
│                            704                               │
└─────────────────────────────────────────────────────────────┘
                              ▼
┌─────────────────────────────────────────────────────────────┐
│   EXTRACT, FOR THE SYSTEM, EXECUTION LINKS FROM EXECUTION    │
│                    TRACES OF THE SYSTEM                      │
│                            706                               │
└─────────────────────────────────────────────────────────────┘
                              ▼
┌─────────────────────────────────────────────────────────────┐
│   GENERATE, BASED ON A CROSSOVER BETWEEN THE EXECUTION       │
│   LINKS AND MODULE LINKS, AN EXECUTION COMPETENCY LIST       │
│                            708                               │
└─────────────────────────────────────────────────────────────┘
                              ▼
┌─────────────────────────────────────────────────────────────┐
│   GENERATE, FOR EACH SOFTWARE GENERATION ENTITY OF THE       │
│  PLURALITY OF SOFTWARE GENERATION ENTITIES, BASED ON THE     │
│  EXECUTION COMPETENCY LIST, A COMBINED COMPETENCY SCORE      │
│                            710                               │
└─────────────────────────────────────────────────────────────┘
                              ▼
┌─────────────────────────────────────────────────────────────┐
│  OBTAIN, FOR A NEW APPLICATION, A SOFTWARE GENERATION ENTITY │
│                            ROLE                              │
│                            712                               │
└─────────────────────────────────────────────────────────────┘
                              ▼
┌─────────────────────────────────────────────────────────────┐
│   IDENTIFY, BASED ON THE COMBINED COMPETENCY SCORE FOR       │
│    EACH SOFTWARE GENERATION ENTITY OF THE PLURALITY OF       │
│  SOFTWARE GENERATION ENTITIES, A SOFTWARE GENERATION         │
│  ENTITY FROM A SORTED LIST OF SOFTWARE GENERATION ENTITIES   │
│   FROM THE PLURALITY OF SOFTWARE GENERATION ENTITIES TO      │
│       PERFORM THE SOFTWARE GENERATION ENTITY ROLE.           │
│                            714                               │
└─────────────────────────────────────────────────────────────┘
                              ▼
┌─────────────────────────────────────────────────────────────┐
│  IMPLEMENT, USING THE IDENTIFIED SOFTWARE GENERATION ENTITY, │
│           DEVELOPMENT OF THE NEW APPLICATION                 │
│                            716                               │
└─────────────────────────────────────────────────────────────┘
```

SYSTEM BEHAVIOR PROFILING-BASED DYNAMIC COMPETENCY ANALYSIS

BACKGROUND

A competency of an entity, such as a software generation entity to perform a specified software generation task, may be measured by examining various attributes of the software generation entity. For example, a code-quality analysis tool may perform a static analysis of code for a software generation entity to measure coding competency of the software generation entity.

BRIEF DESCRIPTION OF DRAWINGS

Features of the present disclosure are illustrated by way of example and not limited in the following figure(s), in which like numerals indicate like elements, in which:

FIG. 4 illustrates software development life cycle (SDLC) traceability artifacts and roles to illustrate operation of the system behavior profiling-based dynamic competency analysis apparatus of FIG. 1 in accordance with an example of the present disclosure;

FIG. 5 illustrates costs associated with different modules for successful and failed executions to illustrate operation of the system behavior profiling-based dynamic competency analysis apparatus of FIG. 1 in accordance with an example of the present disclosure;

FIG. 7 illustrates a flowchart of an example method for system behavior profiling-based dynamic competency analysis in accordance with an example of the present disclosure.

DETAILED DESCRIPTION

Figure 1:
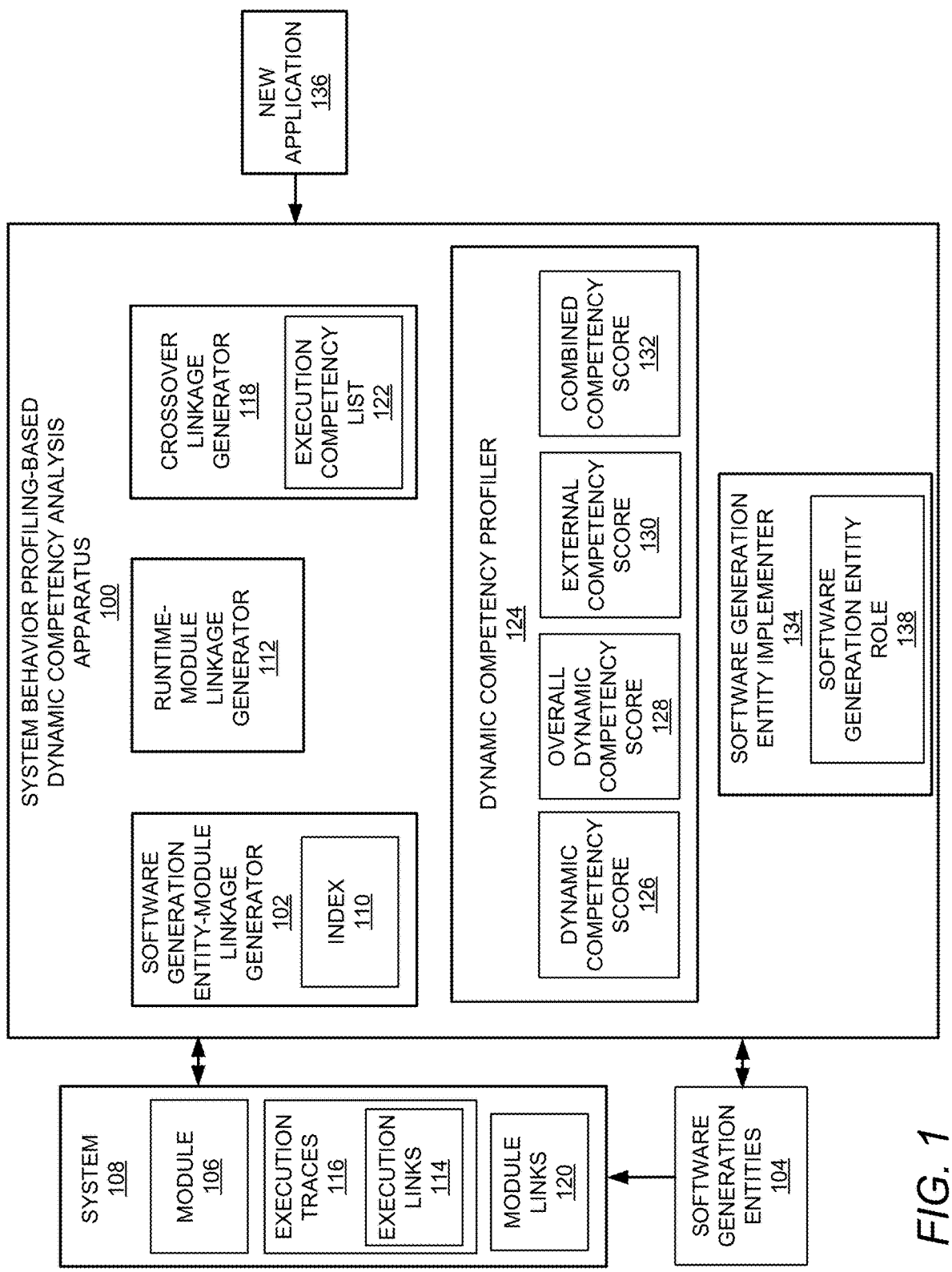
FIG. 1 illustrates a layout of a system behavior profiling-based dynamic competency analysis apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

System behavior profiling-based dynamic competency analysis apparatuses, methods for system behavior profiling-based dynamic competency analysis, and non-transitory computer readable media having stored thereon machine readable instructions to provide system behavior profiling-based dynamic competency analysis are disclosed herein. The apparatuses, methods, and non-transitory computer readable media disclosed herein provide for system behavior profiling-based dynamic competency analysis by implementation of an automated (e.g., without human intervention) process for completing software, application, and system requirement analysis, architectural design, code development, testing, deployment, and maintenance tasks. The apparatuses, methods, and non-transitory computer readable media disclosed herein may be applied to software generation entities, which may include, for example, auto code-generators, automated testing tools, etc. In this regard, the apparatuses, methods, and non-transitory computer readable media disclosed herein may provide for measurement of relative competencies of software generation entities using an outcome-as-proof approach.

With respect to measurement of relative competencies of software generation entities, it technically challenging to dynamically (e.g., continuously) measure relative competencies of software generation entities associated with various systems during their conception, design, development, testing, and maintenance lifecycles based upon the objective assessment of the impact of their work on the actual behavior of the system during its usage.

In order to address at least the aforementioned technical challenges, the apparatuses, methods, and non-transitory computer readable media disclosed herein may utilize runtime information including details of execution traces, and in-particular, defect-logs. The apparatuses, methods, and non-transitory computer readable media disclosed herein may determine association of these runtime details with software generation entities using traceability links. Yet further, the apparatuses, methods, and non-transitory computer readable media disclosed herein may provide for measurement of relative competencies of software generation entities for their capability of system requirement analysis, architecture design, code-development, testing, deployment, and maintenance tasks.

According to examples disclosed herein, with respect to the outcome-as-proof approach, the apparatuses, methods, and non-transitory computer readable media disclosed herein may utilize information which is closest to the eventual outcome of software generation entity contribution. In this regard, the apparatuses, methods, and non-transitory computer readable media disclosed herein may utilize the actual execution of a system for which a software generation entity contributed. For example, every incident or defect during execution of usage of a system may be an indication of negative competency of all those software generation entities having ownership for building that feature (or features) of the code which failed.

According to examples disclosed herein, with respect to end-to-end automation, the apparatuses, methods, and non-transitory computer readable media disclosed herein may be implemented without requiring any manual assessments or interventions at any stage.

According to examples disclosed herein, with respect to explainability, for the apparatuses, methods, and non-transitory computer readable media disclosed herein, competency measures generated by a system may be justified using actual proofs from system execution history and static linkages.

According to examples disclosed herein, the apparatuses, methods, and non-transitory computer readable media disclosed herein provide technical benefits such as generation of a new application that is robust and less prone to failure. For example, the apparatuses, methods, and non-transitory computer readable media disclosed herein provide for identification, based on a combined competency score for each software generation entity of a plurality of software generation entities, a software generation entity to perform a software generation entity role, and implementation, using the identified software generation entity, of development of the new application.

For the apparatuses, methods, and non-transitory computer readable media disclosed herein, metadata in software repositories (e.g., Jira information) may include information on software generation entities such as requirement analysis agents, architecting tools, design entities, development agents, testing tools, and runtime support systems associated with specific tasks, modules, functionalities, and/or components. For example, a source code repository of different components of a system may include identification information of development agents who owned specific code fragments. Similarly, test plans may have details of testing agents who would have tested specific components and/or functionality. In this regard, when a system fails, system execution logs or defect logs may provide details of the components and/or functionality, where an actual fault lies (e.g., the component/functionality), which caused the system to behave erroneously. In the case of when a fault is localized outside of the system (e.g., input data, infrastructure, etc.), the fault may be ignored during estimations. With this information, an application based upon the apparatuses, methods, and non-transitory computer readable media disclosed herein, which may be referred to as a dynamic competency estimator (DCE), may estimate relative competencies of software generation entities associated with the system. Examples of relative competencies may include coding competency, testing competency, design competency, and architecture competency. These measures may be updated automatically (e.g., without human intervention) whenever a system is executed. Not only the defective behavior of the system but also its fault tolerant behaviors, and defect-less executions, as well as user behavior driven positive assessments may be added to these measures to provide a comprehensive yet authoritative view of the competencies of the software generation entities. These measures of the competencies may effectively augment other sources of measuring competencies, which may involve subjective assessments. Furthermore, if these measures are stored using Blockchain based ledgers, these measures may become immutable and visible at a wider scale.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example system behavior profiling-based dynamic competency analysis apparatus (hereinafter also referred to as "apparatus 100").

Referring to FIG. 1, the apparatus 100 may include a software generation entity-module linkage generator 102 that is executed by at least one hardware processor (e.g., the hardware processor 602 of FIG. 6, and/or the hardware processor 804 of FIG. 8) to identify a plurality of software generation entities 104 that have contributed to a module 106 of a system 108. The software generation entity-module linkage generator 102 may generate an index 110 to associate each software generation entity of the plurality of software generation entities 104. As disclosed herein, the software generation entities 104 may include, for example, auto code-generators, automated testing tools, auto requirement analyzers, auto design generators, auto system performance monitors, auto system repairing tools, etc.

According to examples disclosed herein, the software generation entity-module linkage generator 102 may generate the index 110 to associate each software generation entity of the plurality of software generation entities 104 by generating the index 110 that includes a hash table to associate each software generation entity of the plurality of software generation entities 104 by associating, for each software generation entity, an identification of the software generation entity as a key.

A runtime-module linkage generator 112 that is executed by at least one hardware processor (e.g., the hardware processor 602 of FIG. 6, and/or the hardware processor 804 of FIG. 8) may extract, for the system 108, execution links 114 from execution traces 116 of the system 108.

According to examples disclosed herein, the runtime-module linkage generator 112 may extract, for the system 108, the execution links 114 from execution traces 116 of the system 108 by extracting, for the system 108, the execution links 114 that include a total number of executions of the system 108, a status of each execution of the system 108, a list of functions or modules exercised during each execution of the system 108, and/or for failure of the system 108, a list of the functions or modules where root cause analysis identifies a defect.

A crossover linkage generator 118 that is executed by at least one hardware processor (e.g., the hardware processor 602 of FIG. 6, and/or the hardware processor 804 of FIG. 8) may generate, based on a crossover between the execution links 114 and module links 120, an execution competency list 122.

According to examples disclosed herein, the crossover linkage generator 118 may generate, based on the crossover between the execution links 114 and module links 120, the execution competency list 122 by determining a success cost for each software generation entity of the plurality of software generation entities 104, and a failure cost for each software generation entity of the plurality of software generation entities 104.

According to examples disclosed herein, the crossover linkage generator 118 may determine the success cost for each software generation entity of the plurality of software generation entities 104 by determining, for each software generation entity of the plurality of software generation entities 104, whether the software generation entity is linked to a module appearing in a successful execution trace of the execution traces 116. Further, based on a determination, for each software generation entity of the plurality of software generation entities 104, that the software generation entity is linked to the module appearing in the successful execution trace of the execution traces 116, the crossover linkage generator 118 may increase the success cost by a reward value.

According to examples disclosed herein, the crossover linkage generator 118 may determine the failure cost for each software generation entity of the plurality of software generation entities 104 by determining, for each software generation entity of the plurality of software generation entities 104, whether the software generation entity is linked to a module appearing in a list of defective modules after root cause analysis. Further, based on a determination, for each software generation entity of the plurality of software generation entities, that the software generation entity is linked to the module appearing in the list of defective modules after root cause analysis, the crossover linkage generator 118 may increase the failure cost by a penalty value.

A dynamic competency profiler 124 that is executed by at least one hardware processor (e.g., the hardware processor 602 of FIG. 6, and/or the hardware processor 804 of FIG. 8) may generate, for each software generation entity of the plurality of software generation entities 104, based on the execution competency list 122, a dynamic competency score 126 for the software generation entity for the system 108. The dynamic competency profiler 124 may determine, for each software generation entity of the plurality of software generation entities 104, based on a combination of the dynamic competency score 126 for the system 108 with respect to dynamic competency scores for other systems, an overall dynamic competency score 128. The dynamic competency profiler 124 may determine, for each software generation entity of the plurality of software generation entities 104, based on a combination of the overall dynamic competency score 128 and an external competency score 130, a combined competency score 132.

According to examples disclosed herein, the dynamic competency profiler 124 may generate, for each software generation entity of the plurality of software generation entities 104, based on the execution competency list 122, the dynamic competency score 126 for the software generation entity for the system 108 by dividing, for each software generation entity of the plurality of software generation entities 104, a difference between the reward value and the penalty value by a sum of the reward value and the penalty value.

A software generation entity implementer 134 that is executed by at least one hardware processor (e.g., the hardware processor 602 of FIG. 6, and/or the hardware processor 804 of FIG. 8) may obtain, for a new application 136, a software generation entity role 138. The software generation entity implementer 134 may identify, based on the combined competency score 132 for each software generation entity of the plurality of software generation entities 104, a software generation entity of the plurality of software generation entities 104 to perform the software generation entity role 138. The software generation entity implementer 134 may implement, using the identified software generation entity, development of the new application 136.

Figure 2:
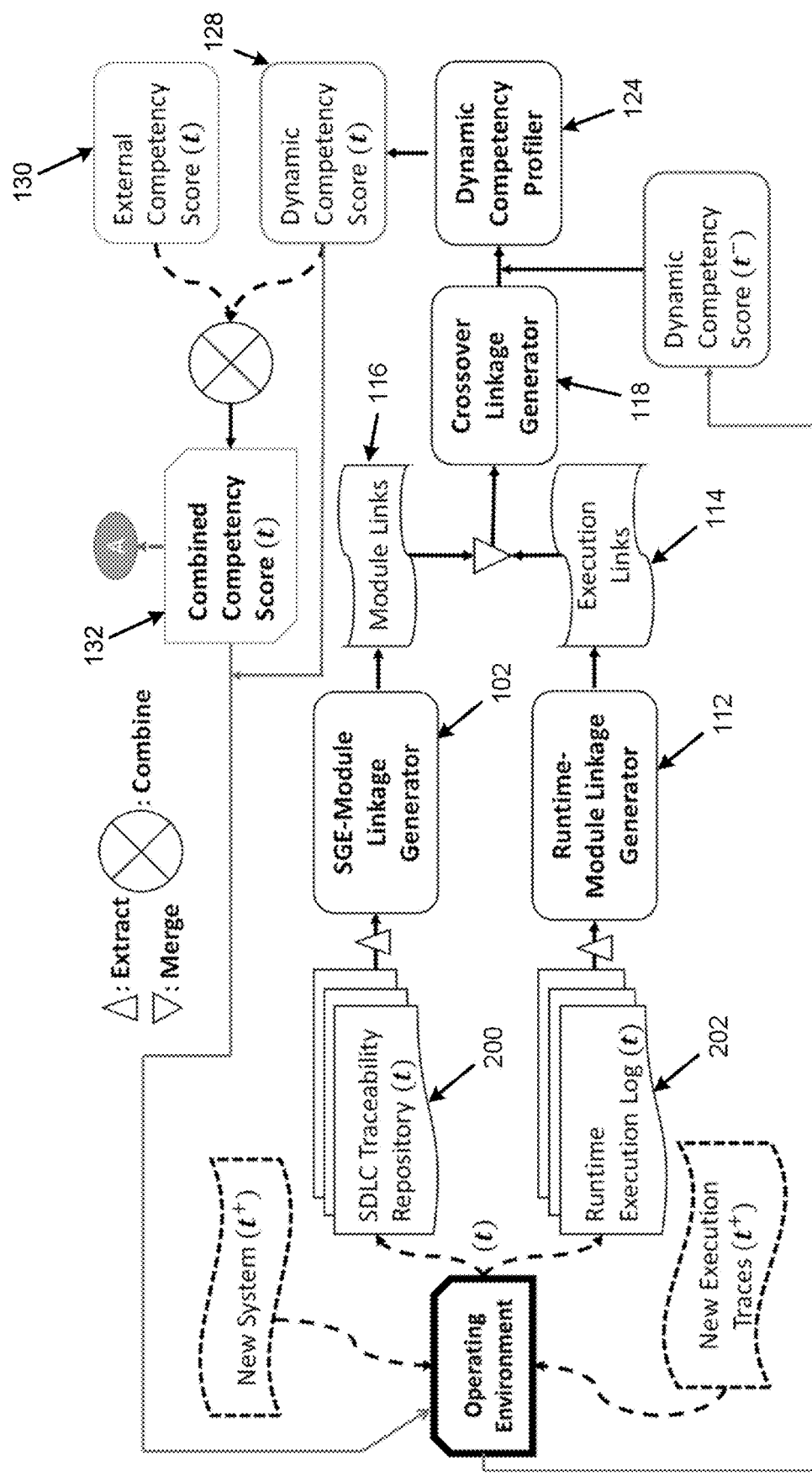
FIG. 2 illustrates a logical flow to illustrate operation of the system behavior profiling-based dynamic competency analysis apparatus of FIG. 1 in accordance with an example of the present disclosure.

FIG. 2 illustrates logical flow to illustrate operation of the apparatus 100 in accordance with an example of the present disclosure.

Referring to FIGS. 1 and 2, and particularly to FIG. 2, t may represent a time-point of execution of the system 108, $t^-$ may represent a previous time point, and $t^+$ may represent a future time point. Granularity of time may be determined by operating environment. A module may represent an atomic element of the system 108 for which various associations (with software generation entities and executions) are present in the software development life cycle (SDLC) traceability repositories and executions logs. If a module is associated with multiple software generation entities for the same role, its successful or failed executions may have the same contribution to competencies of all these software generation entities. In FIG. 2, when details about a new system ($t^+$) or new execution traces ($t^+$) of existing systems become available, these details may be added to existing software development life cycle (SDLC) traceability repository (t) 200 and runtime execution log (t) 202 respectively, and all of the steps of estimating various parameters may be executed again to finally update estimates for dynamic competency score ($t^+$) 128 and combined competency score ($t^+$) 132.

A software development life cycle (SDLC) traceability repository 200 may include details generated and used during various stages of software life cycles. A runtime execution log 202 may include details on sequence of modules which were executed when the system was being used together with resource information (e.g., memory).

The software generation entity-module linkage generator (SMLG) 102 may create an index associating each software generation entity having contributed to specific modules under a specific role. For example, the software generation entity-module linkage generator 102 may generate an index 110 to associate each software generation entity of the plurality of software generation entities 104.

The runtime-module linkage generator (RMLG) 112 may create an index associating modules which were executed during system runtime with execution status and root cause analysis. For example, the runtime-module linkage generator 112 may extract, for the system 108, execution links 114 from execution traces 116 of the system 108.

The crossover linkage generator (CLG) 118 may combine information from an employee-module linkage and a runtime-module linkage such that each software generation entity is associated with modules which were executed during system runtime. For example, the crossover linkage generator 118 may generate, based on a crossover between the execution links 114 and module links 120, an execution competency list 122.

The dynamic competency profiler (DyCP) 124 may determine (e.g., estimate) competencies of software generation entities associated with runtime execution of the system as per their role. For example, the dynamic competency profiler 124 may generate, for each software generation entity of the plurality of software generation entities 104, based on the execution competency list 122, a dynamic competency score 126 for the software generation entity for the system 108. The dynamic competency profiler 124 may determine, for each software generation entity of the plurality of software generation entities 104, based on a combination of the dynamic competency score 126 for the system 108 with respect to dynamic competency scores for other systems, an overall dynamic competency score 128. The dynamic competency profiler 124 may determine, for each software generation entity of the plurality of software generation entities 104, based on a combination of the overall dynamic competency score 128 and an external competency score 130, a combined competency score 132.

Figure 3:
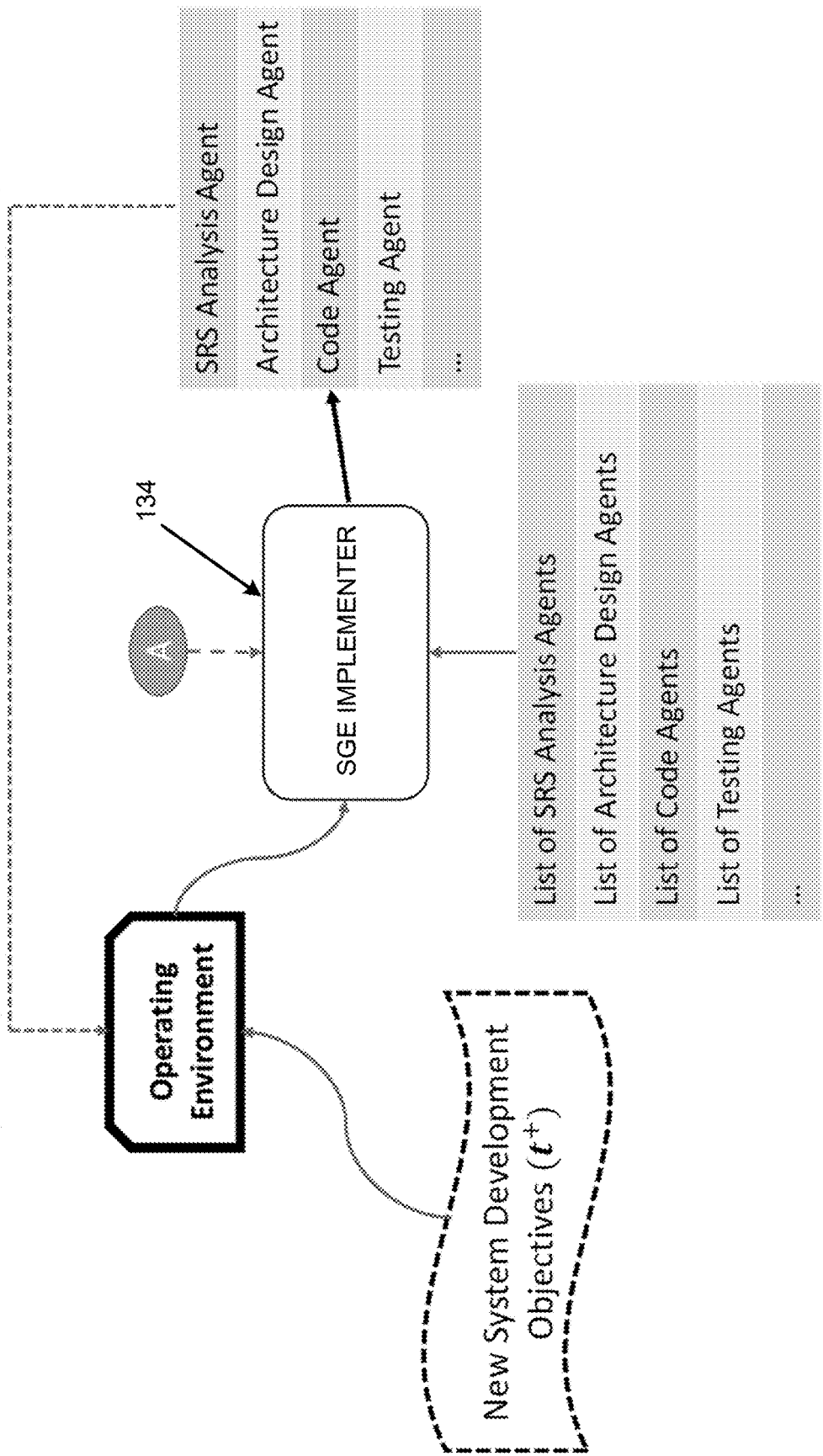
FIG. 3 illustrates an example of selection of software generation entities for a new application development to illustrate operation of the system behavior profiling-based dynamic competency analysis apparatus of FIG. 1 in accordance with an example of the present disclosure.

FIG. 3 illustrates an example of selection of software generation entities for a new application development to illustrate operation of the apparatus 100 in accordance with an example of the present disclosure.

Referring to FIGS. 2 and 3, the software generation entity implementer 134 may select software generation agents using competency scores for various roles for new application development scenario. For example, the software generation entity implementer 134 may obtain, for a new application 136, a software generation entity role 138 (e.g., new system development objectives). The software generation entity implementer 134 may identify, based on the combined competency score 132 for each software generation entity of the plurality of software generation entities 104, a software generation entity of the plurality of software generation entities 104 to perform the software generation entity role 138. For example, the software generation entity implementer 134 may identify, based on the combined competency score for each software generation entity of the plurality of software generation entities, a software generation entity from a sorted list of software generation entities from the plurality of software generation entities to perform the software generation entity role. The software generation entity implementer 134 may implement, using the identified software generation entity, development of the new application 136.

An external competency score 130 may represent an estimate of other competency profiling tools.

A combined competency score may represent a combination of the dynamic competency score 128 and the external competency score 130.

FIG. 4 illustrates SDLC traceability artifacts and roles to illustrate operation of the apparatus 100 in accordance with an example of the present disclosure.

Referring to FIG. 4, with respect to SDLC traceability artifacts, SDLC roles may include technical and functional architect, system design agent, software development agent, software testing agent, deployment agent, maintenance agent, and project management agent.

Referring again to FIGS. 1 and 2, the software generation entity-module linkage generator 102 may generate the index 110 to associate each software generation entity of the plurality of software generation entities 104. In this regard, for each system X in system list L_(x,t) at time point using data from static software repositories, the software generation entity-module linkage generator 102 may create an inverted index (hash table) associating each software generation entity (using its ID as key) having contributed to any module in any role as follows:

| | |
|---|---|
| Module Links(X) | $sge_r \rightarrow \{(Module_i, Role_i, Cost_i) | i \in 1..M_x\}$ |
| $sge_r$ | ID for the $r^{th}$ Software Generation Entity |
| $Module_i$ | $i^{th}$ module of system X |
| $Role_i$ | Role of $SGE_r$ for $Module_i$ |
| $Cost_{i,X} = (Cost_{i,S,X}, Cost_{i,F,X})$ | Reward and Cost associated with successful and failed executions of $Module_i$ |
| $M_x$ | Number of modules in system X |

The runtime-module linkage generator 112 may extract, for the system 108, execution links 114 from execution traces 116 of the system 108. For example, the runtime-module linkage generator 112 may extract information from execution traces of the system 108 during its runtime executions while being used. The information may include, for example, a total number of executions of the system 108. Further, for each execution, the information may include a status of successful (e.g., system executed end-to-end in its operation), or failed (e.g., system execution resulted in an unexpected behavior), a list of functions or modules exercised during execution, and if system failed, a list of modules or functions where root cause analysis identified defects. This information may be captured in execution links 114.

Next, the crossover linkage generator 118 may generate, based on a crossover between the execution links 114 and module links 120, an execution competency list 122. In this regard, using a crossover between the execution links 114 with the module links 120, the crossover linkage generator 118 may build an execution competency list 122 as follows. For each software generation entity associated with the system, the following statistic that include success cost and failure cost may be collected across all executions of System X. With respect to success cost, if sge_r is linked to the modules appearing in the successful execution traces, success cost may be increased as follows:

$$\text{Reward}(\text{System } X, SGE\ sge_r, \text{Role } R) \mathrel{+}= \Sigma r_i * \text{Cost}_{i,S,X}$$

$r_i$=0 if $i^{th}$ module is not linked with $sge_r$, otherwise number of times $i^{th}$ module got executed with which $sge_r$ was associated under Role R With respect to failure cost, for each software generation entity linked to the modules appearing in the list of defective modules after root cause analysis, failure cost may be increased as follows:

$$\text{Penalty}(\text{System } X, SGE\ sge_r, \text{Role } R) \mathrel{+}= \Sigma r_i * \text{Cost}_{i,F,X}$$

$r_i$=0 if $i^{th}$ module is not linked with $sge_r$, otherwise number of times an error was found in the $i^{th}$ module under root cause analysis with which $sge_r$ was associated under Role R.

Based upon the role of the software generation entity, these costs may be added under the corresponding roles of $sge_r$.

The dynamic competency profiler 124 may generate, for each software generation entity of the plurality of software generation entities 104, based on the execution competency list 122, a dynamic competency score 126 for the software generation entity for the system 108. Using the execution competency list 122, the dynamic competency profiler 124 may determine (e.g., estimate) dynamic competency of the software generation entity for system X. Specifically, for each software generation entity sge_r associated with the System X for Role R, the dynamic competency score 126 may be determined as follows:

$$\text{Dynamic\_Competency}(X, sge_r, R) = \frac{\text{Reward}(X, sge_r, R) - \text{Penalty}(X, sge_r, R)}{\text{Reward}(X, sge_r, R) + \text{Penalty}(X, sge_r, R)}$$

The dynamic competency profiler 124 may combine dynamic competency of the software generation entity with respect to the current system with scores with respect to other systems as follows:

$$\text{Overall\_Dynamic\_Competency}(SysList\ L_{x,t}, SGE\ sge_r, \text{Role } R, \text{Time } t) =$$

$$(1-\lambda)\Delta(t^-) + \lambda \sum_{X \in L_{x,t}} w_X * \text{Dynamic\_Competency}(X, sge_r, R, t)$$

-continued $$\Delta(t^-) = \begin{cases} \text{Overall\_Dynamic\_Competency}(L_{x,t^-}, sge_r, R, t^-) & \text{if } t > 0 \\ 0 & \text{if } t = 0 \end{cases}$$

$w_X$ = relative significance of system $X$ in the SysList $L_{x,t}$ (default = 1)

$\lambda =$ aging factor $\in [0, 1]$ (default 0.75) // ensures that older associations get increasingly lower weightage as compared to recent ones.

The dynamic competency profiler 124 may combine the dynamic competency score 126 with the external competency score 130 as a linear convex of both as follows:

CombinedCompetencyScore($X,sge_r,R,t$)=β*ODC+(1−β)*ECS

ODC=Overall_Dynamic_Competency($X,sge_r,R,t$)

ECS=External_Competency_Score($X,sge_r,R,t$)

β∈ [0,1] (with default=0.5) measures comparative significance of ODC and ECS.

The competency scores may then be applied in a new application development scenarios. As inputs, new application development objectives may include a list of roles for which software generation entities are required towards meeting the objectives. With respect to the competency scores, the software generation entity implementer 134 may sort different software generation entities for each role. For example, the software generation entity implementer 134 may generate a sorted list of system requirement specification (SRS) analysis agents with respect to their requirement analysis competency scores as per a set of existing applications. According to another example, the software generation entity implementer 134 may generate a sorted list of architecture design agents with respect to their architecture design competency scores as per set of existing applications. According to another example, the software generation entity implementer 134 may generate a sorted list of software development agents with respect to their coding competency scores as per set of existing applications. As per the new application development objectives, the software generation entity implementer 134 may select the topmost software generation entities for different roles from the sorted lists and signals operating environment for the application of these software generation entities to achieve development objectives.

An example of operation of the apparatus 100 is described in further detail with reference to FIGS. 1-5.

Specifically, for the example of operation of the apparatus 100, the inputs to the apparatus 100 may include the following:

System: Banking Web system αBank having 15 modules m1, . . . , m15
Software generation entity ID: eXYZ123
Role: Software Development
SDLC Traceability Repository: Source Code with code comments including details of source code ownership at module level
Prior dynamic competency score=0
External competency score=0.7
Time point t=0

FIG. 5 illustrates costs associated with different modules for successful and failed executions to illustrate operation of the apparatus 100 in accordance with an example of the present disclosure.

Continuing with the example of operation of the apparatus 100, a runtime execution log may include execution traces 116 for last one week, and details of five incidents that occurred with root causes identified as follows:
Incident #1: {m3}
Incident #2: {m7}
Incident #3: {m3, m13}
Incident #4: {m13}
Incident #5: {m3, m7}

Continuing with the example of operation of the apparatus 100, using code comments from code, the software generation entity-module linkage generator 102 may create an inverted index (hash table) associating each software generation entity that contributed in authoring source code for αBank as follows:
Module Links:sge→{(Module,Cost,Coding)}
e.g., it will have an entry such as:
"eXYZ123"→{(m1, (0.1, 1), Coding), (m1, (0.2, 2), Coding), (m1, (0.3, 3), Coding)}

Continuing with the example of operation of the apparatus 100, the runtime-module linkage generator 112 may extract information from execution traces of αBank of last one week as follows:
Total number of executions: 87
Status for 5 executions: Failed. In this regard, for each module, a number of times, root cause analysis identified defects in it may be specified as:
{(m1, 0), (m2, 0), (m3, 3), (m4, 0), . . . , (m7, 2), . . . , (m13, 2), . . . (m15, 0)}
Status for 82 executions: Success. In this regard, a number of times each module associated with the software generation entity that was exercised during these executions may be specified as m1: 37, m2: 2, m3: 65

The aforementioned information may be captured in execution details.

Continuing with the example of operation of the apparatus 100, using a crossover between execution links 114 with module links 120, the crossover linkage generator 118 may build the execution competency list. In this regard, for the software generation entity, the crossover linkage generator 118 may determine the following statistics:

Reward(*eXYZ*123,coding)=(37*0.1)±(2*0.2)±(62*0.3)=22.7

Penalty(*eXYZ*123,coding)=0+0+3×3=9

Continuing with the example of operation of the apparatus 100, using the execution competency list, the dynamic competency profiler 124 may estimate dynamic competency of the software generation entity. For each software generation entity associated with the system:
For the software generation entity role (e.g., R):

DynamicCompetency("*eXYZ*123",coding)=(22.7−9)/(22.7+9)=0.43

Overall_Dynamic_Competency("*eXYZ*123",coding)=
0*0.3+0.43*0.7=0.301//Using default aging factor 2=0.7

Combined Competency Score(*eXYZ*123,coding)=
0.5*0.301+0.5*0.7−0.5

As disclosed herein, with respect to the competency scores, the software generation entity implementer 134 may sort different software generation entities for each role based on their respective competency scores. In this regard, the software generation entity implementer 134 may implement, using the identified software generation entity (e.g., software generation entity with the highest combined competency score 132), development of the new application 136 as disclosed herein.

Figure 6:
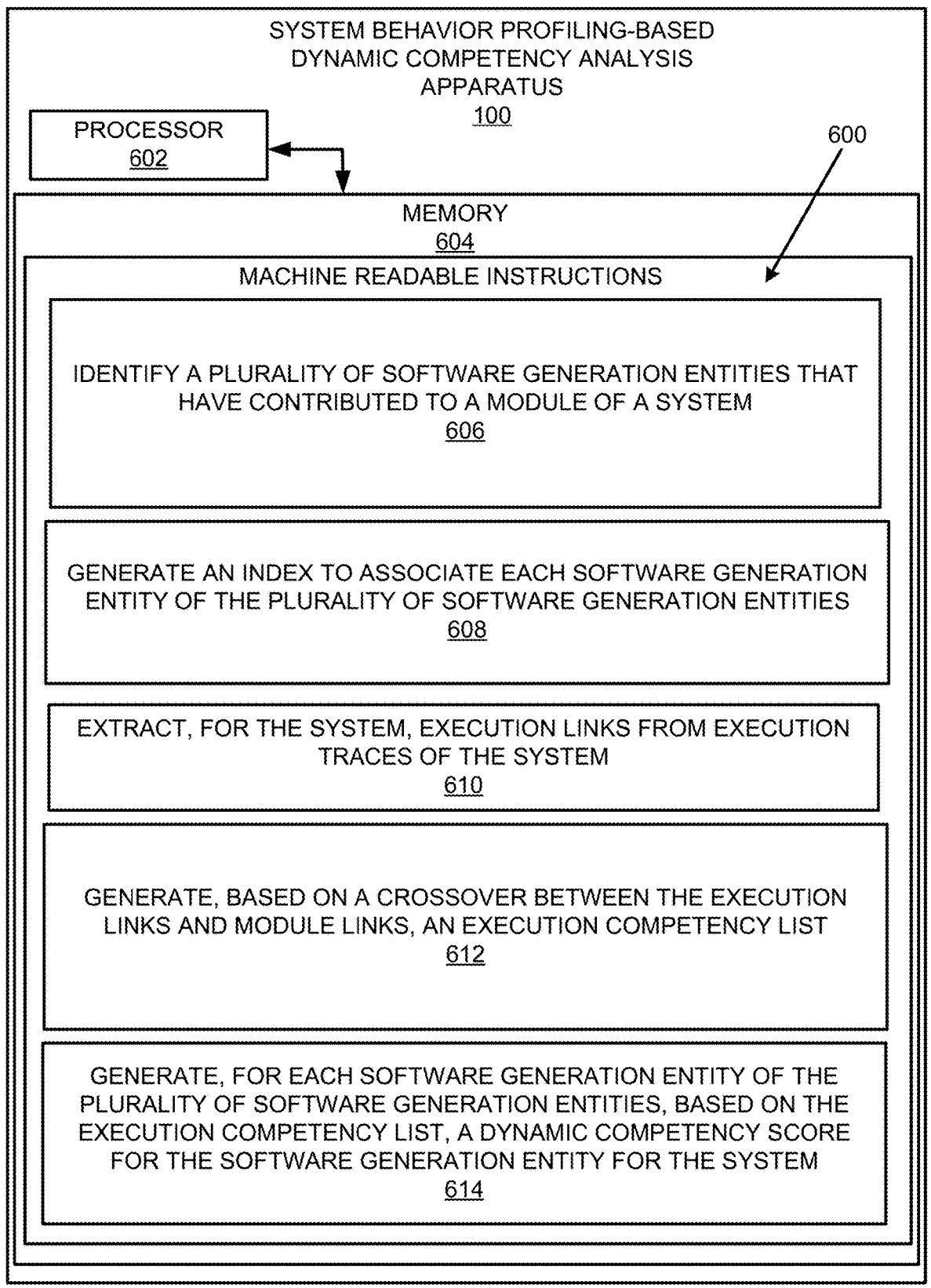
FIG. 6 illustrates an example block diagram for system behavior profiling-based dynamic competency analysis in accordance with an example of the present disclosure.
Figure 6:
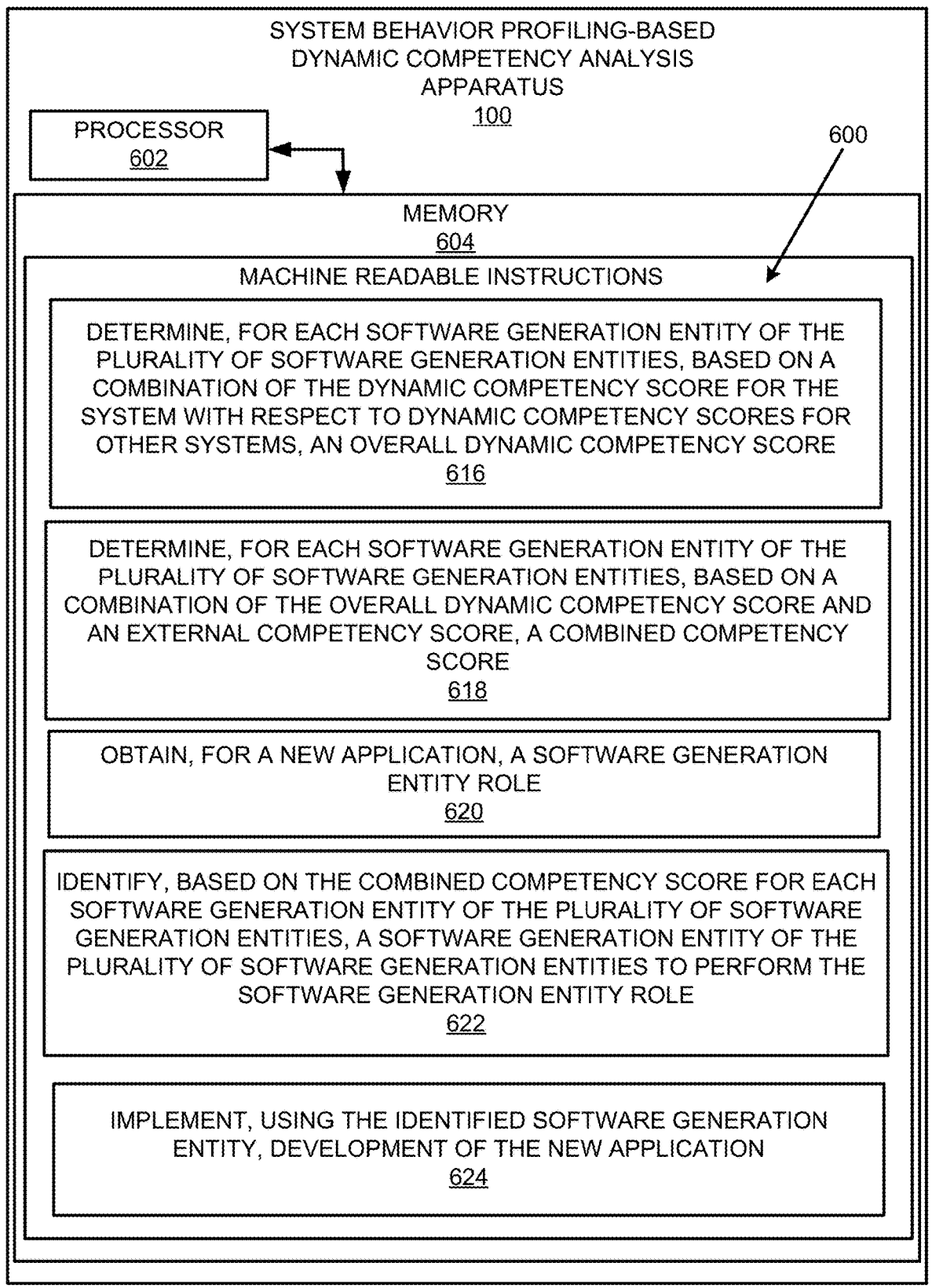
Figure 8:
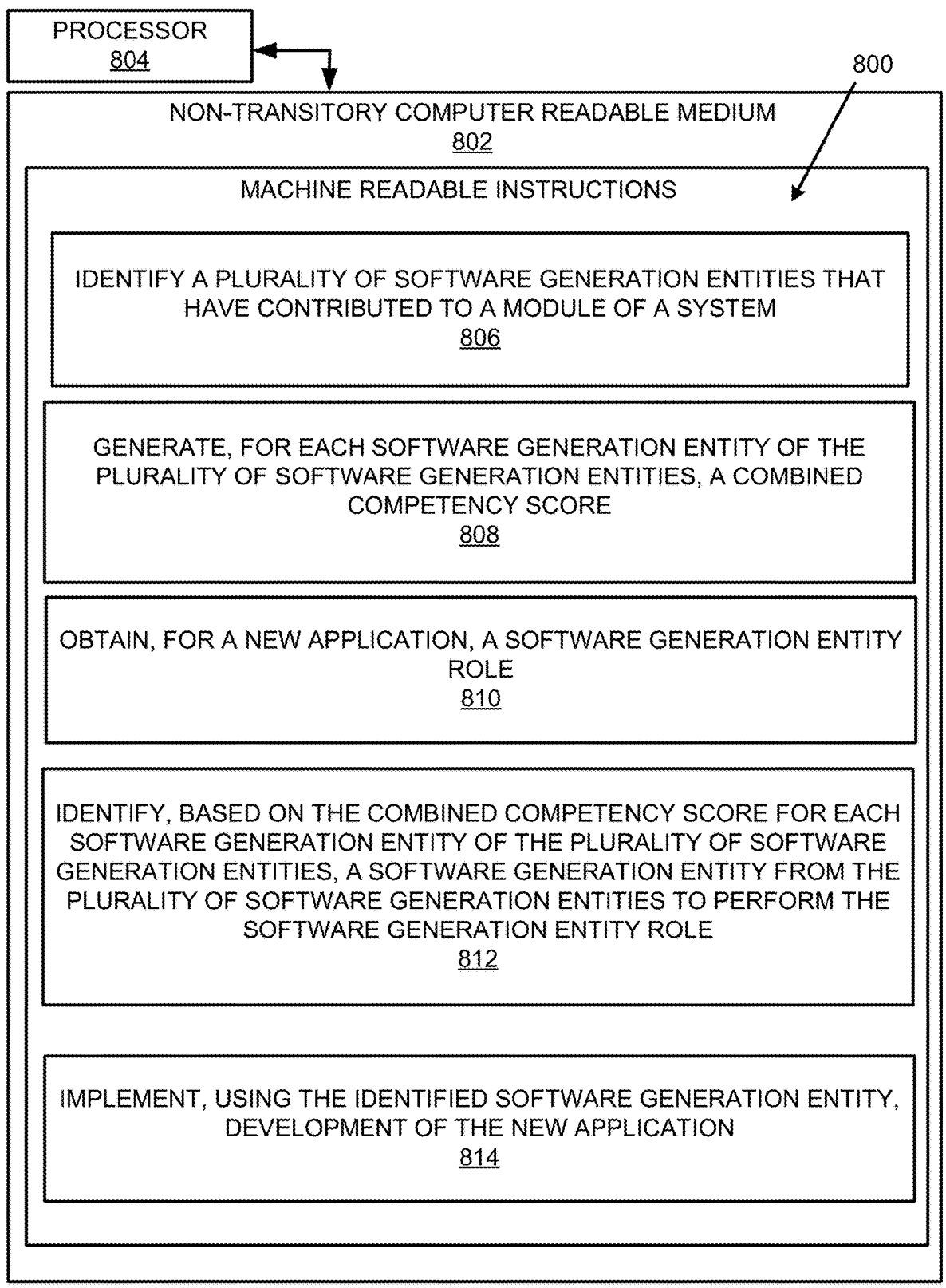
FIG. 8 illustrates a further example block diagram for system behavior profiling-based dynamic competency analysis in accordance with another example of the present disclosure.

FIGS. 6-8 respectively illustrate an example block diagram 600, a flowchart of an example method 700, and a further example block diagram 800 for system behavior profiling-based dynamic competency analysis, according to examples. The block diagram 600, the method 700, and the block diagram 800 may be implemented on the apparatus 100 described above with reference to FIG. 1 by way of example and not of limitation. The block diagram 600, the method 700, and the block diagram 800 may be practiced in other apparatus. In addition to showing the block diagram 600, FIG. 6 shows hardware of the apparatus 100 that may execute the instructions of the block diagram 600. The hardware may include a processor 602, and a memory 604 storing machine readable instructions that when executed by the processor cause the processor to perform the instructions of the block diagram 600. The memory 604 may represent a non-transitory computer readable medium. FIG. 7 may represent an example method for system behavior profiling-based dynamic competency analysis, and the steps of the method. FIG. 8 may represent a non-transitory computer readable medium 802 having stored thereon machine readable instructions to provide system behavior profiling-based dynamic competency analysis according to an example. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to identify a plurality of software generation entities 104 that have contributed to a module 106 of a system 108.

The processor 602 may fetch, decode, and execute the instructions 608 to generate an index 110 to associate each software generation entity of the plurality of software generation entities 104.

The processor 602 may fetch, decode, and execute the instructions 610 to extract, for the system 108, execution links 114 from execution traces 116 of the system 108.

The processor 602 may fetch, decode, and execute the instructions 612 to generate, based on a crossover between the execution links 114 and module links 120, an execution competency list 122.

The processor 602 may fetch, decode, and execute the instructions 614 to generate, for each software generation entity of the plurality of software generation entities 104, based on the execution competency list 122, a dynamic competency score 126 for the software generation entity for the system 108.

The processor 602 may fetch, decode, and execute the instructions 616 to determine, for each software generation entity of the plurality of software generation entities 104, based on a combination of the dynamic competency score 126 for the system 108 with respect to dynamic competency scores for other systems, an overall dynamic competency score 128.

The processor 602 may fetch, decode, and execute the instructions 618 to determine, for each software generation entity of the plurality of software generation entities 104, based on a combination of the overall dynamic competency score 128 and an external competency score 130, a combined competency score 132.

The processor 602 may fetch, decode, and execute the instructions 620 to obtain, for a new application 136, a software generation entity role 138.

The processor 602 may fetch, decode, and execute the instructions 622 to identify, based on the combined competency score 132 for each software generation entity of the plurality of software generation entities 104, a software generation entity of the plurality of software generation entities 104 to perform the software generation entity role 138.

The processor 602 may fetch, decode, and execute the instructions 624 to implement, using the identified software generation entity, development of the new application 136.

Referring to FIGS. 1-5 and 7, and particularly FIG. 7, for the method 700, at block 702, the method may include identifying a plurality of software generation entities that have contributed to a module of a system.

At block 704, the method may include generating an index to associate each software generation entity of the plurality of software generation entities.

At block 706, the method may include extracting, for the system, execution links from execution traces of the system.

At block 708, the method may include generating, based on a crossover between the execution links and module links, an execution competency list.

At block 710, the method may include generating, by the at least one hardware processor, for each software generation entity of the plurality of software generation entities, based on the execution competency list, a combined competency score.

At block 712, the method may include obtaining, by the at least one hardware processor, for a new application, a software generation entity role.

At block 714, the method may include identifying, based on the combined competency score for each software generation entity of the plurality of software generation entities, a software generation entity from a sorted list of software generation entities from the plurality of software generation entities to perform the software generation entity role.

At block 716, the method may include implementing, using the identified software generation entity, development of the new application.

Referring to FIGS. 1-5 and 8, and particularly FIG. 8, for the block diagram 800, the non-transitory computer readable medium 802 may include instructions 806 to identify a plurality of software generation entities that have contributed to a module of a system.

The processor 804 may fetch, decode, and execute the instructions 808 to generate, for each software generation entity of the plurality of software generation entities, a combined competency score.

The processor 806 may fetch, decode, and execute the instructions 810 to obtain, for a new application, a software generation entity role.

The processor 806 may fetch, decode, and execute the instructions 812 to identify, based on the combined competency score for each software generation entity of the plurality of software generation entities, a software generation entity from the plurality of software generation entities to perform the software generation entity role.

The processor 806 may fetch, decode, and execute the instructions 814 to implement, using the identified software generation entity, development of the new application.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A system behavior profiling-based dynamic competency analysis apparatus comprising:
    a software generation entity-module linkage generator, executed by at least one hardware processor, to
        identify a plurality of software generation entities that have contributed to a module of a system, and
        generate an index to associate each software generation entity of the plurality of software generation entities;
    a runtime-module linkage generator, executed by the at least one hardware processor, to
        extract, for the system, execution links from execution traces of the system;
    a crossover linkage generator, executed by the at least one hardware processor, to
        generate, based on a crossover between the execution links and module links, an execution competency list;
    a dynamic competency profiler, executed by the at least one hardware processor, to
        generate, for each software generation entity of the plurality of software generation entities, based on the execution competency list, a dynamic competency score for the software generation entity for the system,
        determine, for each software generation entity of the plurality of software generation entities, based on a combination of the dynamic competency score for the system with respect to dynamic competency scores for other systems, an overall dynamic competency score, and
        determine, for each software generation entity of the plurality of software generation entities, based on a combination of the overall dynamic competency score and an external competency score, a combined competency score; and
    a software generation entity implementer, executed by the at least one hardware processor, to
        obtain, for a new application, a software generation entity role,
        identify, based on the combined competency score for each software generation entity of the plurality of software generation entities, a software generation entity of the plurality of software generation entities to perform the software generation entity role, and
        implement, using the identified software generation entity, development of the new application.

2. The system behavior profiling-based dynamic competency analysis apparatus according to claim 1, wherein the software generation entity-module linkage generator is executed by the at least one hardware processor to generate the index to associate each software generation entity of the plurality of software generation entities by:
    generating the index that includes a hash table to associate each software generation entity of the plurality of software generation entities by associating, for each software generation entity, an identification of the software generation entity as a key.

3. The system behavior profiling-based dynamic competency analysis apparatus according to claim 1, wherein the runtime-module linkage generator is executed by the at least one hardware processor to extract, for the system, the execution links from execution traces of the system by:
    extracting, for the system, the execution links that include at least one of:
        a total number of executions of the system;
        a status of each execution of the system;
        a list of functions or modules exercised during each execution of the system; or
        for failure of the system, a list of the functions or modules where root cause analysis identifies a defect.

4. The system behavior profiling-based dynamic competency analysis apparatus according to claim 1, wherein the crossover linkage generator is executed by the at least one hardware processor to generate, based on the crossover between the execution links and module links, the execution competency list by determining:
    a success cost for each software generation entity of the plurality of software generation entities; and
    a failure cost for each software generation entity of the plurality of software generation entities.

5. The system behavior profiling-based dynamic competency analysis apparatus according to claim 4, wherein the crossover linkage generator is executed by the at least one hardware processor to determine the success cost for each software generation entity of the plurality of software generation entities by:
    determining, for each software generation entity of the plurality of software generation entities, whether the software generation entity is linked to a module appearing in a successful execution trace of the execution traces; and
    based on a determination, for each software generation entity of the plurality of software generation entities, that the software generation entity is linked to the module appearing in the successful execution trace of the execution traces, increasing the success cost by a reward value.

6. The system behavior profiling-based dynamic competency analysis apparatus according to claim 5, wherein the crossover linkage generator is executed by the at least one hardware processor to determine the failure cost for each software generation entity of the plurality of software generation entities by:
    determining, for each software generation entity of the plurality of software generation entities, whether the software generation entity is linked to a module appearing in a list of defective modules after root cause analysis; and
    based on a determination, for each software generation entity of the plurality of software generation entities, that the software generation entity is linked to the module appearing in the list of defective modules after root cause analysis, increasing the failure cost by a penalty value.

7. The system behavior profiling-based dynamic competency analysis apparatus according to claim 6, wherein the dynamic competency profiler is executed by the at least one hardware processor to generate, for each software generation entity of the plurality of software generation entities, based on the execution competency list, the dynamic competency score for the software generation entity for the system by:
dividing, for each software generation entity of the plurality of software generation entities, a difference between the reward value and the penalty value by a sum of the reward value and the penalty value.

8. A method for system behavior profiling-based dynamic competency analysis, the method comprising:
identifying, by at least one hardware processor, a plurality of software generation entities that have contributed to a module of a system;
generating, by the at least one hardware processor, an index to associate each software generation entity of the plurality of software generation entities;
extracting, by the at least one hardware processor, for the system, execution links from execution traces of the system;
generating, by the at least one hardware processor, based on a crossover between the execution links and module links, an execution competency list;
generating, by the at least one hardware processor, for each software generation entity of the plurality of software generation entities, based on the execution competency list, a dynamic competency score for the software generation entity for the system;
determining, by the at least one hardware processor, for each software generation entity of the plurality of software generation entities, based on a combination of the dynamic competency score for the system with respect to dynamic competency scores for other systems, an overall dynamic competency score;
determining, by the at least one hardware processor, for each software generation entity of the plurality of software generation entities, based on a combination of the overall dynamic competency score and an external competency score, a combined competency score;
obtaining, by the at least one hardware processor, for a new application, a software generation entity role;
identifying, by the at least one hardware processor, based on the combined competency score for each software generation entity of the plurality of software generation entities, a software generation entity from a sorted list of software generation entities from the plurality of software generation entities to perform the software generation entity role; and
implementing, by the at least one hardware processor, using the identified software generation entity, development of the new application.

9. The method for system behavior profiling-based dynamic competency analysis, according to claim 8, wherein generating, by the at least one hardware processor, the index to associate each software generation entity of the plurality of software generation entities further comprises:
generating, by the at least one hardware processor, the index that includes a hash table to associate each software generation entity of the plurality of software generation entities by associating, for each software generation entity, an identification of the software generation entity as a key.

10. The method for system behavior profiling-based dynamic competency analysis, according to claim 8, wherein extracting, by the at least one hardware processor, for the system, the execution links from execution traces of the system further comprises:
extracting, by the at least one hardware processor, for the system, the execution links that include at least one of:
a total number of executions of the system;
a status of each execution of the system;
a list of functions or modules exercised during each execution of the system; or
for failure of the system, a list of the functions or modules where root cause analysis identifies a defect.

11. The method for system behavior profiling-based dynamic competency analysis, according to claim 8, wherein generating, by the at least one hardware processor, based on the crossover between the execution links and module links, the execution competency list further comprises determining, by the at least one hardware processor:
a success cost for each software generation entity of the plurality of software generation entities; and
a failure cost for each software generation entity of the plurality of software generation entities.

12. The method for system behavior profiling-based dynamic competency analysis, according to claim 11, wherein determining, by the at least one hardware processor, the success cost for each software generation entity of the plurality of software generation entities further comprises:
determining, by the at least one hardware processor, for each software generation entity of the plurality of software generation entities, whether the software generation entity is linked to a module appearing in a successful execution trace of the execution traces; and
based on a determination, by the at least one hardware processor, for each software generation entity of the plurality of software generation entities, that the software generation entity is linked to the module appearing in the successful execution trace of the execution traces, increasing the success cost by a reward value.

13. The method for system behavior profiling-based dynamic competency analysis, according to claim 12, wherein determining, by the at least one hardware processor, the failure cost for each software generation entity of the plurality of software generation entities further comprises:
determining, by the at least one hardware processor, for each software generation entity of the plurality of software generation entities, whether the software generation entity is linked to a module appearing in a list of defective modules after root cause analysis; and
based on a determination, by the at least one hardware processor, for each software generation entity of the plurality of software generation entities, that the software generation entity is linked to the module appearing in the list of defective modules after root cause analysis, increasing the failure cost by a penalty value.

14. A non-transitory computer readable medium having stored thereon machine readable instructions, the machine readable instructions, when executed by at least one hardware processor, cause the at least one hardware processor to:
identify a plurality of software generation entities that have contributed to a module of a system;
generate, based on a crossover between execution links and module links, an execution competency list by determining a success cost for each software generation entity of the plurality of software generation entities and a failure cost for each software generation entity of the plurality of software generation entities;

generate, for each software generation entity of the plurality of software generation entities, based on the execution competency list, a dynamic competency score for the software generation entity for the system;
determine, for each software generation entity of the plurality of software generation entities, based on a combination of the dynamic competency score for the system with respect to dynamic competency scores for other systems, an overall dynamic competency score;
determine, for each software generation entity of the plurality of software generation entities, based on a combination of the overall dynamic competency score and an external competency score, a combined competency score;
obtain, for a new application, a software generation entity role;
identify, based on the combined competency score for each software generation entity of the plurality of software generation entities, a software generation entity from the plurality of software generation entities to perform the software generation entity role; and
implement, using the identified software generation entity, development of the new application.

15. The non-transitory computer readable medium according to claim 14, wherein the machine readable instructions, when executed by the at least one hardware processor, further cause the at least one hardware processor to:
generate an index that includes a hash table to associate each software generation entity of the plurality of software generation entities by associating, for each software generation entity, an identification of the software generation entity as a key.

16. The non-transitory computer readable medium according to claim 14, wherein the machine readable instructions, when executed by the at least one hardware processor, further cause the at least one hardware processor to:
extract for the system, execution links that include at least one of:
a total number of executions of the system;
a status of each execution of the system;
a list of functions or modules exercised during each execution of the system; or
for failure of the system, a list of the functions or modules where root cause analysis identifies a defect.

17. The non-transitory computer readable medium according to claim 14, wherein the machine readable instructions to determine the success cost for each software generation entity of the plurality of software generation entities, when executed by the at least one hardware processor, further cause the at least one hardware processor to:
determine, for each software generation entity of the plurality of software generation entities, whether the software generation entity is linked to a module appearing in a successful execution trace of the execution traces; and
based on a determination, for each software generation entity of the plurality of software generation entities, that the software generation entity is linked to the module appearing in the successful execution trace of the execution traces, increase the success cost by a reward value.

\* \* \* \* \*